United States Patent
Bergius et al.

[11] 3,821,994
[45] July 2, 1974

[54] MOTOR SLEIGH AND SLED FOR USE IN CONNECTION WITH SAME

[75] Inventors: Rauno Bergius, Jyvaskyla; Heikki Liuhanen; Kauko Kallio, both of Oulu, all of Finland

[73] Assignee: Valmet Oy, Helsinki, Finland

[22] Filed: Apr. 7, 1972

[21] Appl. No.: 242,185

[52] U.S. Cl. ............................ 180/5 R, 180/9.24 A
[51] Int. Cl. ......................................... B62m 27/02
[58] Field of Search ........................... 180/5 R, 9.24

[56] References Cited
UNITED STATES PATENTS

| | | | |
|---|---|---|---|
| 3,148,743 | 9/1964 | Jarvi | 180/5 R |
| 3,213,955 | 10/1965 | Hetteen | 180/5 R |
| 3,362,492 | 1/1968 | Hansen | 180/5 R |
| 3,509,955 | 5/1970 | Lichfield | 180/5 R |
| 3,707,199 | 12/1972 | Gerich | 180/5 R |

Primary Examiner—Richard J. Johnson
Attorney, Agent, or Firm—Richards & Geier

[57] ABSTRACT

A motor sleigh composed of structural units which are rapidly detachable and mutually attachable for facilitating transport, servicing and storage of the motor sleigh and for increasing the possible uses of the track chassis. The invention is particularly characterized in that the motor sleigh comprises a first, light structural unit comprising the body structure with seat, and a second structural unit, substantially heavier than the first, which comprises the track mat with its return wheels and spring suspension system and the engine with transmission gear, and that the structural units comprise quick attachment means for their attachment together.

According to a specific embodiment, the quick attachment means consists of a mating body affixed to the body of the second structural unit and having a substantially horizontal mating surface and inclined side surfaces, and with which fits together a mating body affixed to the body of the body structure, the mating bodies having been arranged to be attached to each other by screws.

2 Claims, 7 Drawing Figures

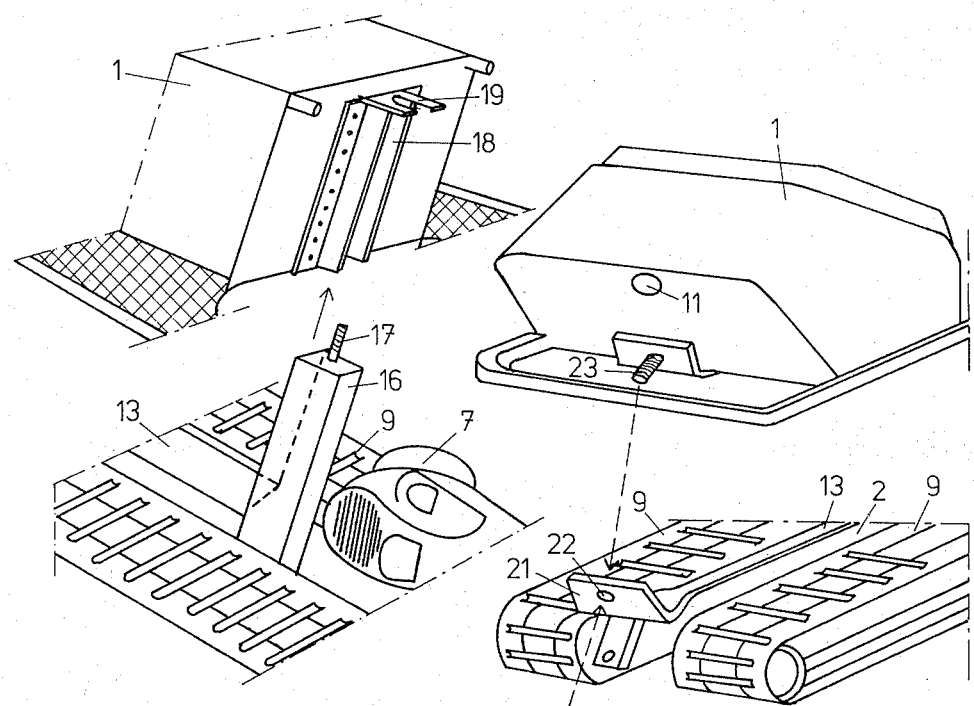
FIG. 4
FIG. 5
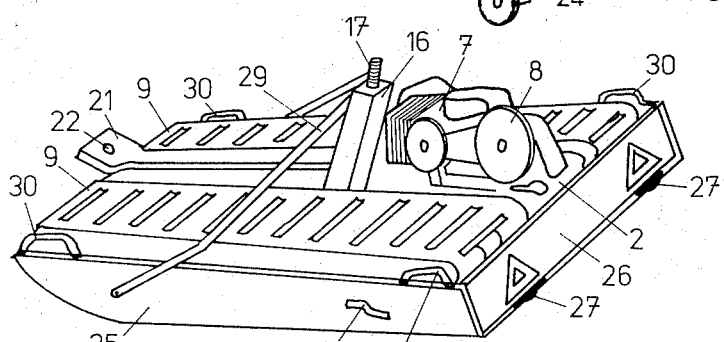
FIG. 6
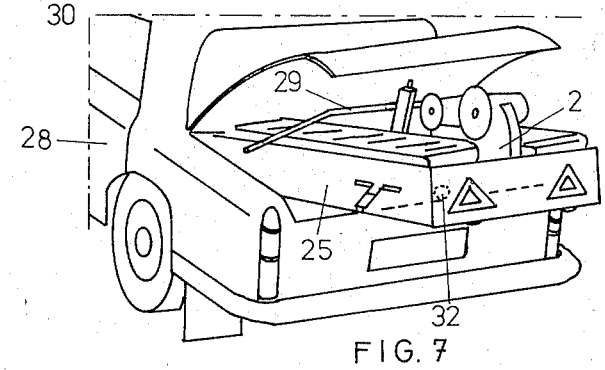
FIG. 7

MOTOR SLEIGH AND SLED FOR USE IN CONNECTION WITH SAME

The object of the present invention is a motor sleigh composed of structural units which are rapidly detachable from each other and attachable to each other for the purpose of facilitating the transport, servicing and storage of the motor sleigh and for increasing the possible uses of the track chassis.

A further object of the invention is a sled for use in connection with the motor sleigh specified above, in particular for transporting the motor sleigh in a passenger car.

Motor sleighs belonging to prior art have rather large overall dimensions and they are comparatively heavy, which circumstances have rendered it impossible to transport a motor sleigh by means of a passenger car without trailer. Since in motor sleighs of prior art the shafts of the traction wheels and supporting wheels of the track mat generally have been journalled directly in the seat box made of sheet material by bending, the servicing and repairs of the track mat and spring suspension system are cumbersome owing to poor accessibility. Especially in thaw weather conditions snow tends to accumulate under the seat box in poorly accessible points, resulting in an increase of the motor sleigh's weight.

The aims of the invention are achieved and the drawbacks mentioned above are eliminated in a motor sleigh mainly characterized in that the motor sleigh comprises a first, light structural unit comprising the body structure with seat and a second structural unit substantially heavier than the first, which comprises the track mat with its return wheels and spring suspension and the engine with transmission mechanism, and that the structural units include quick attachment means for attaching the structural units to each other.

As regards the sled constituting an object of the invention and which has been intended in particular to serve as a transporting base for the motor sleigh, it may be observed that various transporting bases are known in prior art, but these have been units for towing behind a car and they are quite heavy and expensive. The drawbacks of prior transporting bases further include the fact that they have to be licensed and provided with tail and turning lights.

The aim of the invention is to provide a sled which can be transported along in the car and which may be used, in addition to its duty as a transport base for the motor sleigh, as a trailer sled after the motor sleigh for transporting goods and persons.

The sled according to the invention, in its turn, is characterized mainly in that the sled has been so dimensioned that the said second structural unit of the motor sleigh just fits into its and that the sled has been provided with a detachable and/or turnable tailboard in order that the motor sleigh can be driven onto the sled without any need of lifting it.

It is thus understood that according to the invention the engine and transmission system of the sleigh together with the track mat and spring suspension constitutes the second structural unit, which has such outer dimensions that the unit in question, being the heavier structure, can be placed in the luggage space of a passenger car, most appropriately by utilizing the sled according to the invention. The first structural unit, comprising the body part, can be transported on the roof fixture of a passenger car; being a light unit, it does not interfere with the management of the car.

The invention and various embodiment examples of the same are described in detail with reference to the schematic drawings in the attached drawing, but the invention is not confined merely to solutions according to these.

FIG. 4 shows the attachment of the rear end of the motor sleigh in the quick attachment according to FIG. 3, and FIG. 5 shows in corresponding manner the attachment of the front end.

FIG. 6 shows a sled according to the invention, in which the second, heavier structural unit of a motor sleigh according to the invention has been placed for transport.

FIG. 7 shows a sled according to FIG. 6 and the structural unit of the motor sleigh, placed in the luggage space of a passenger car for transport.

Figure 1:
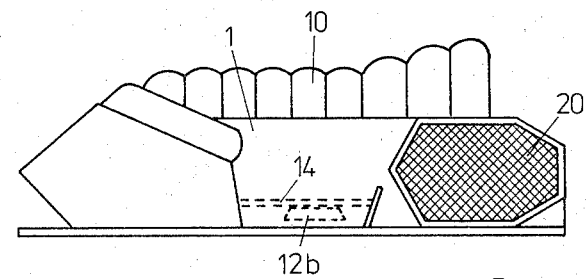
FIG. 1 shows the principle of division of the motor sleigh into structural units.

According to FIG. 1, the motor sleigh consists of structural units, whereof the first structural unit 1 comprises the body structure with seat 10. The body further comprises, most appropriately detachable, motor guards 20, which are of a net-like design. Owing to its light weight the first structural unit 1 is appropriate to be transported on the car-top luggage rack.

The second structural unit 2 is substantially heavier than the first, and it comprises the track mat 9 with its return wheels and spring suspension, the engine 7 with its transmission gear, whereof the variator has been indicated with the reference numeral 8. The second structural unit 2 is independently operable without the first structural unit 1, so that two or several structural units 2 may be connected in parallel or one after the other in situations requiring an exceptionally low surface pressure. This is also partly achieved by the means that the leads and wires from the engine 7 to the steering column 4 have been combined within an elastic cable 5, whereby the detachable steering column with light fixtures and controls stays with the second structural unit 2 (FIG. 1). The steering ski 3 belonging to the motor sleigh can be detached and mounted in the bearing of the body structure (the aperture which admits the rod of the steering ski 3 has been indicated with reference numeral 11 in FIG. 5) and in connection with the steering column 4 by means of a quick coupling 6a, 6b, which is of a design previously known in itself. It is thus understood that the steering ski 3 is transported as a separate unit. For the steering column 4 special clamps may be provided on the structural unit 2 or on the sled 25, which will be described later (these clamps have not been depicted) so that the steering column with its light fixtures is not subject to battering.

Figure 2:
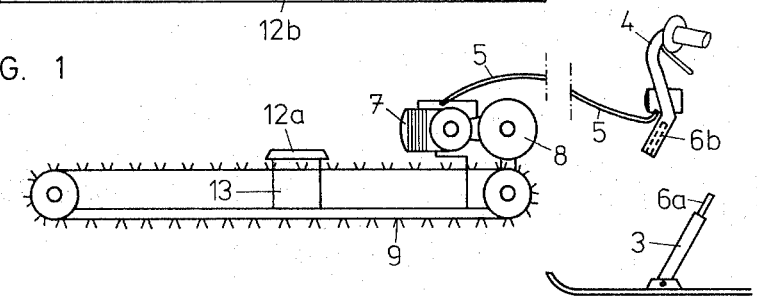
FIG. 2 shows the detailed design of the quick attachment means employed in FIG. 1, as a sectional view.
Figure 2:
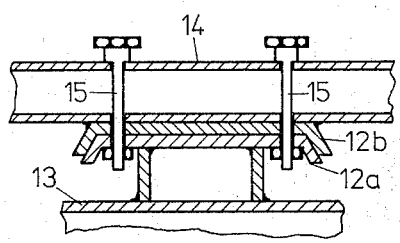

The structural unit 1 and 2 are attachable to each other by quick attachment means, one embodiment example of which has been shown in FIG. 2. This quick attachment means consists of a mating body 12a attached to the body 13 of the second structural unit 2 and which has a rather extensive, substantially horizontal mating surface, to the edges of which adjoin downwardly sloping mating surfaces encricling this surface. The mating body 12a just described fits together with another mating body 12b fixed to the body beam 14 of the body structure and of the first structural unit 1 and which also has a plane central portion and downwardly sloping marginal portions. The quick attachment means 12a, 12b has a self-registering characteristic owing to its inclined marginal portions. On the lower surface of the mating body 12a, opposite to holes provided in the mating body, nuts are affixed by means of which the body structure is secured in its place with the aid of screws 15. The screws 15 pass through the beam 14 and there is most appropriately one of them in each corner of the mating bodies 12a, 12b. Even with only one quick attachment means 12a, 12b of the kind desceibed a rather sturdy attachment is achieved between the structural units 1 and 2.

Figure 3:
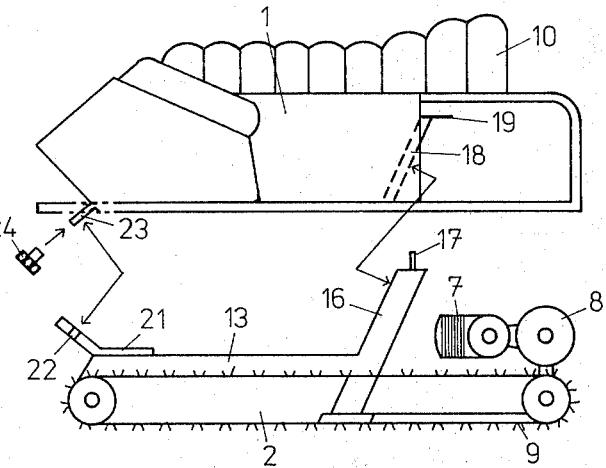
FIG. 3 shows another mode of quick attachment of the structural units. In this figure the steering ski and steering column have been omitted for the sake of clarity.

In FIGS. 3, 4 and 5 another mode of quick attachment of the structural units 1 and 2 has been shown, wherein two separate quick attachment means have been used, of which the one found at the front end of the motor sleigh, 21–24, may also be applied in combination with a quick attachment means according to FIG. 2. To the body 13 of the second structural unit 2 a beam 16 directed obliquely backward with reference to the travelling direction of the motor sleigh has been attached, and which has on its upper end a fixing means 17, e.g., a screw with nut. In the body structure, that is in the structural unit 1, on the front wall of its engine space, an attachment groove 18 has been provided (FIG. 4) into which the beam 16 fits. The fixing groove 18 and beam 16 are appropriately pyramidally narrowing in the upward direction, whereby a quick attachment means is obtained which tightens by wedge action, and which is secured by the fixing means 17 in a fork 19 in connection with the fixing groove 18. The quick attachment means of the front end of the motor sleigh consists of a mating body 21 attached to the body 13 and having a hole 22, into which the pin 23 of the mating body attached to the body structure fits. This attachment may be secured by means of a nut 24 fitting the thread of the pin 23. The pin 23 may also be utilized when the motor sleigh is being transported, when the body structure is placed on the car-top luggage rack. It is then possible to attach to the edge of said rack a fixing means corresponding to the mating body 21 and in which the pin 23 may be secured with a nut for the duration of transport.

The light-weight sled 25 according to the invention (FIG. 6) is consistent, as regards its length and breadth, with the dimensions of the structural unit 2, that is with those of the track mat 9. When the motor sleigh is to be transported, its structural unit 2 may be driven into the sled 25 after the tailboard 26 of this sled has been turned down in its hinges 27 and/or detached. If the body part of the sleigh is transported on the car-top rack, the structural unit 2 may be secured in the sled 25 by means of the suitably shaped drawbar 29. One or several wheels 32 are mounted level with the rim of the luggage compartment of the passenger car 28 and the lighter front end of the sled 25 is lifted upon this wheel or these wheels. When the rear end of the sled 25 is lifted, e.g., by handles 30, the sled will then slide into the luggage compartment on the wheels 32. The sled 25 may be secured in the luggage compartment by hooks 31. Since the spring-mounted chassis of the sleigh has been secured to the rigid sled 25, no damage of the luggage compartment can occur. The sled 25 is suitable to be used as a conventional trailer sled when driving the motor sleigh. The sled 25 may be made of plastic, wood or metal. When the sled 25 serves as a trailer sled, it is possible to steer the motor sleigh from this sled by means of an extended steering rod, which is advantageous especially when driving in soft snow, because the weight of the driver is then transferred from the heavier sleigh to the lighter sled.

We claim:

1. Motor sleigh comprising structural units and a track chassis in one of said units, said units being rapidly detachable from each other and attachable to each other for facilitating transport, servicing and storage of the motor sleigh and for increasing the possible uses of the track chassis, said structural units comprising a first, light structural unit having a body structure with seat, a second structural unit substantially heavier than the first one, having a body, a track mat with its return wheels and spring suspension system and a motor with transmission gear, quick attachment means for attachment of said first and second structural units to each other, said quick attachment means comprising a first mating body affixed to the body of the second structural unit and having a substantially horizontal mating surface and inclined side surfaces, a second mating body affixed to the body structure of the first structural unit, said mating bodies fitting together, and screw means for attaching said mating bodies to each other.

2. Motor sleigh according to claim 1, wherein there is at the front end of the motor sleigh as a second quick attachment means a mating body affixed to the body of the second structural unit and provided with a hole, and a pin in the body structure of the first structural unit, said pin fitting into said hole.

* * * * *

UNITED STATES PATENT OFFICE
CERTIFICATE OF CORRECTION

Patent No. 3,821,994                Dated July 2, 1974

Inventor(s) Rauno Bergius et al.

It is certified that error appears in the above-identified patent and that said Letters Patent are hereby corrected as shown below:

On the cover sheet insert

-- [30] Foreign Application Priority Data

Finland           207/72          Jan. 26, 1972  --.

Signed and sealed this 17th day of September 1974.

(SEAL)
Attest:

McCOY M. GIBSON JR.              C. MARSHALL DANN
Attesting Officer               Commissioner of Patents